United States Patent Office 3,258,490
Patented June 28, 1966

3,258,490
ALKYLENE POLYAMINE COMPLEXES WITH LITHIUM PERCHLORATE AND METHOD OF PRODUCING THEM
Stanley F. Bedell, Andover, Mass., assignor to Monsanto Research Corporation, St. Louis, Mo., a corporation of Delaware
No Drawing. Filed July 2, 1962, Ser. No. 207,462
7 Claims. (Cl. 260—583)

This invention relates to compounds of lithium perchlorate, and more particularly, provides novel methods of forming insoluble compounds of lithium perchlorate, and novel products comprising lithium perchlorate.

Lithium perchlorate is extremely soluble in organic solvents. The perchlorates are generally soluble, but lithium perchlorate is unique among the alkali metal perchlorates in that its organic solvent solubility is even greater than its solubility in water.

In analytical procedures, it is common to precipitate a metal or group of metals with a coordinating or chelating agent. With appropriate coordinating compounds, many metal salts can be essentially quantitatively precipitated out of solution. However, for analysis of lithium-containing materials, this procedure is not used, because of the lack of known selective precipitants of lithium compounds. Thus lithium is usually separated by procedures which maintain it in solution while other metal ions are removed. For example, lithium compounds may be extracted from aqueous solution with an organic solvent, other metals may be precipitated while lithium remains in solution, and so forth.

The chelating compounds which are used to precipitate metal ions or salts from solution in such analytical and purification procedures are compounds containing two or more donor groups. The atoms exerting a donor effect in the functional group of a coordinating compound include nitrogen, oxygen, and to some extent sulfur. It is known that the most stable chelates of the alkali metals are formed with compounds in which the donor atoms are oxygen atoms. In studies of the diamines as chelating compounds, using various metal salts such as those of the heavy metals for which N-containing donor groups have the strongest coordinating tendency, it has been established that the most stable compounds are those in which a 5-membered ring is formed by the two amine groups. Such rings are formed where a chain of two carbon atoms intervenes between the two amine groups, and the metal ion forms the 5th member of the ring. Thus ethylene diamine forms more stable chelation compounds than trimethylene diamine, and the chelation compounds formed by tetramethylene diamine are still less stable, and so forth.

It is an object of this invention to provide novel insoluble compounds of lithium perchlorate.

A particular object of this invention is to provide novel chelation compounds of lithium perchlorate characterized by high stability and insolubility in organic solvents.

A further object of this invention is to provide a novel method of precipitating lithium perchlorate from solution.

These and other objects will become evident on a consideration of the following specification and claims.

It has now been found that lithium perchlorate forms high-melting stable compounds, which are insoluble in organic solvents, with aliphatic diamines containing at least 3 carbon atoms.

Thus for example, while tetramethylene diamine dissolves readily in diethyl ether, and lithium perchlorate is very soluble in this solvent, addition of tetramethylene diamine to lithium perchlorate in ether solution promptly and effectively precipitates substantially all the lithium perchlorate from solution.

As will be evident from the foregoing discussion, this is an unexpected discovery. The aliphatic diamines would not be expected to have a strong coordinating ability for an alkali metal, and produce a stable compound. In any case, it would be expected that a short chain amine would be more favorable than one forming large chelate rings such as tetramethylene diamine. In fact, however, it has now been shown that where a chain of 4 or more carbon atoms intervenes between the terminal amine amine groups, the presently provided 1:1 complexes of lithium perchlorate with aliphatic diamines remain stable and unmelted at temperatures of 200° C. and above.

The present discovery has particular value in view of the above-discussed fact that selective precipitants of lithium compounds are generally unavailable. It may be employed to advantage in analytical and purification procedures. For example, in my copending application S.N. 207,460 filed concurrently herewith, I have provided 1:1 and 1:2 molar adducts of hydrazine perchlorate with lithium perchlorate. As pointed out in the said application, at these molar ratios, which correspond to the eutectics of the system, the products are uniquely resistant to detonation by impact. These eutectics are advantageously formed, it has been found, in organic solution, as further described in a copending application S.N. 207,472 filed concurrently herewith by Joseph J. Byrne. I have found that if these eutectics are dissolved in an organic solvent and tetramethylene diamine is added to the solution, no precipitate appears, but if an excess of lithium perchlorate is present in the solution and this diamine is introduced, the lithium perchlorate is precipitated promptly and completely. Thus in preparing the stated adducts by addition of lithium perchlorate to a solution of hydrazine perchlorate, the present invention obviates the need for careful measurement of the amount of lithium perchlorate to be added. An amount in excess of the calculated ratio can be used, and by addition of the diamine, the solution is titrated back to the exact molar ratio. The precipitate can then be filtered off and the solution evaporated down to provide the eutectic adduct without undesirable deviation in the product from the molar ratio.

Studies of the phase diagram of the presently provided chelation compounds indicate that what is formed is a 1:1 molar addition compound. Indications are observed of the formation of the 1:2 lithium perchlorate:diamine complex at sufficiently high concentrations of the diamine, but the stable material which is ordinarily obtained by the stated precipitation method is the 1:1 complex.

These 1:1 chelation compounds of the trimethylene to hexamethylene diamines with lithium perchlorates are high-melting materials. The tetramethylene diamine chelation compound of lithium perchlorate melts at above 200° C. and the hexamethylene diamine compound is even higher-melting. Thus the present 1:1 complex compounds can readily be isolated from even warm solutions.

Conducting the method of the invention for precipitating the lithium perchlorate from an organic solution is effected simply by adding the diamine to the organic solution containing lithium perchlorate dissolved therein, until all of the lithium perchlorate has been precipitated out of solution. In general, each of the diamine/ lithium perchlorate adducts are highly insoluble in the solvents in which lithium perchlorate is soluble. The solid precipitate of the adduct can be isolated by procedures such as filtration or the like. In general the precipitation of the lithium perchlorate from the solution by the diamine is sufficiently close to quantitative that this operation can be conducted simply by titration with the diamine or a solution thereof, in which the diamine is added gradually until no further precipitation occurs. Formation of the 1:1 adduct consumes equimolar amounts of the lithium perchlorate and the diamine.

The aliphatic diamines are relatively low melting compounds, and their mixture with the coordination compounds formed with lithium perchlorate depresses the melting point of the latter sharply. If this results in formation of eutectics melting at below operating temperatures, an oil will be formed which is miscible with organic liquids and cannot be separated therefrom as the crystalline coordination compounds can. Thus an excess of the diamine is to be avoided. However, with members of the series having chain length longer than the trimethylene diamine, this point is not reached, even at temperatures of up to 100° C. at ratios as high as 3 moles of diamine to 2 moles of lithium perchlorate. Tetramethylene diamine, indeed, can be introduced in ratios as high as more than 4 moles per mole of the perchlorate without detriment.

Presently useful aliphatic diamines are alkylene diamines containing at least three carbon atoms. The presently preferred diamines are primary diamines, in which both amine groups are primary amine. The chain joining the terminal amine groups may be aliphatic hydrocarbon or aliphatic hydrocarbon interrupted by secondary amine bonds. For example, useful alkylene diamines include trimethylene diamine, tetramethylene diamine, 2-methyl-1,4-butanediamine, pentamethylene diamine, hexamethylene diamine, decamethylene diamine and the like. Useful dialkylene triamines include 3,3'-iminobis(ethylamine), 3-[(2-aminoethyl)amino]propylamine, and the like. The polymethylene diamines are preferred and tetramethylene diamine is especially preferred.

Solvents from which lithium perchlorate can be precipitated in the form of an adduct with a diamine, in accordance with this invention include any of a wide variety of oxygen-containing solvents of lithium perchlorate. Thus for example, lithium perchlorate can be dissolved to the following extent in the following oxygen-containing solvents (grams lithium perchlorate per 100 grams solvent):

| | |
|---|---|
| Methanol | 182 |
| Ethanol | 152 |
| n-Propanol | 105 |
| n-Butanol | 79 |
| i-Butanol | 58 |
| Acetone | 137 |
| Ethyl acetate | 95 |
| Diethyl ether | 114 |

Thus illustrative of the alcohol solvents from which lithium perchlorate may be precipitated and the presently provided novel adducts formed in accordance with this invention include alcohols such as methyl, ethyl, isopropyl, n-propyl, isobutyl and the like. The solvent may be a ketone such as acetone, methyl ethyl ketone, ethyl butyl ketone and so forth or an ester such as methyl acetate, ethyl acetate, propyl acetate, methyl formate, ethylene glycol diacetate, ethyl malonate, ethyl n-butyrate and so forth. Or, it may be an ether, which may be a straight chain ether such as diethyl ether, isobutyl ether, n-butyl ether, the monomethyl and dimethyl ethers of ethylene glycol and so forth, or a cyclic ether such as dioxane. The above mentioned ketones and esters may also be cyclic as illustrated for example by cyclohexanone and benzyl acetate.

So far as is known, the presently provided high-melting 1:1 complexes of lithium perchlorate with an aliphatic diamine are new compounds. They may be employed for a variety of purposes, in addition to the above-described preparation of such compounds to provide an insoluble complex of lithium perchlorate. The complexed lithium perchlorate decreases the basicity of the amines and thus favorably alters their reactivity. Thus for example, whereas ammonium perchlorate reacts with a diamine on being heated with it, evolving ammonia and forming the perchloric acid salt of the amine, when ammonium perchlorate is added to a heated melt comprising the present complexes, it dissolves without reacting. The violence of reaction of alkylene diamines with diisocyanates in the formation of polyureas is also decreased when the diamine is complexed with the perchlorate. Mixtures of the stated complex with lithium perchlorate form eutectics which can be employed to provide novel polymeric products as disclosed in copending application SN 207,470 filed concurrently herewith by Lucius G. Gilman and Robert I. Lait.

The invention is illustrated but not limited by the following examples.

*Example 1*

Solutions containing respectively 1 gram (g.) of tetramethylene diamine in 10 cubic centimeters (cc.) of anhydrous ether and 0.6 g. anhydrous lithium perchlorate in 20 cc. of anhydrous ether, are prepared separately and then mixed. The diamine and the perchlorate are respectively completely soluble in the ether solutions. When the solutions are mixed, a white hygroscopic precipitate appears immediately.

The complex formed by the diamine of the lithium perchlorate can be separated from the ethereal mother liquor by filtration. When alcohol is added to the isolated complex, it fails to dissolve it.

*Example 2*

Solutions are prepared consisting respectively of a solution of 0.5325 g. (0.005 mole) of lithium perchlorate in 50 cc. of diethyl ether, and 0.37 g. of trimethylenediamine in 25 cc. of diethyl ether. The amine solution is added rapidly to the lithium perchlorate solution, with both at a temperature of 25° C. A white solid precipitates out immediately.

The experiment is repeated, by addition of 0.296 g. (0.004 mole) of trimethylene diamine in 25 cc. of ether, and a solution of 0.426 g. of anhydrous lithium perchlorate in 50 cc. of anhydrous ether. On addition of the diamine solution to the perchlorate solution, the white solid again precipitates immediately.

The lithium perchlorate/trimethylene diamine 1:1 complex melts sharply at 95–105° C. The tetramethylene and hexamethylene 1:1 complexes melt at above 200° C., while the complex of iminobis(propylamine) melts at about 140° C.

*Example 3*

The hydrazine perchlorate/lithium perchlorate eutectic compounds are prepared by making up mixes having the following compositions:

| | Parts | Weight, Percent | Mole, Percent |
|---|---|---|---|
| 1:1 Eutectic: | | | |
| $LiClO_4$ | 178 | 44.5 | 50 |
| $N_2H_5ClO_4$ | 222 | 55.5 | 50 |
| 1:2 Eutectic: | | | |
| $LiClO_4$ | 246 | 61.6 | 66.1 |
| $N_2H_5ClO_4$ | 154 | 38.4 | 33.9 |

Each of the mixes is fused by heating to 180° C. They form clear melts, with a large decrease in volume. After solidification, the eutectics are dense solids, which each melt at about 100–110° C.

The properties of these eutectics are distinctly different from those of gross physical mixtures of the same composition in the same proportions. Up to 26 parts by weight of the 1:2 eutectic dissolves in one part of tetramethylene diamine at 85° C., and up to 38 parts of the 1:1 eutectic dissolves under the same conditions, each forming a clear melt, while less than 0.2 parts of lithium perchlorate can be put into solution in this amine at this temperature.

Samples of the stated eutectics are each dissolved in diethyl ether, and a third solution is prepared by dissolving about the same amount of the hydrazine perchlorate/lithium perchlorate 1:1 eutectic in the same volume of solvent, but dissolving additional lithium perchlorate in this solution. Then tetramethylene diamine is slowly added to each of the ether solutions of the eutectics. No precipitate appears in the solution of the 1:2 ratio eutectic, and no precipitate appears in the solution of the 1:1 eutectic, but in the third solution, containing lithium perchlorate in addition to the lithium perchlorate/hydrazine perchlorate eutectic, precipitation is produced immediately by the addition of the tetramethylene diamine. Addition of the tetramethylene diamine is continued until no further precipitation appears to occur, after which the solids are filtered off and the filtrate is evaporated, by gentle heating under vacuum, until all of the ether has been removed. The residue is the 1:1 molar ratio lithium perchlorate/hydrazine perchlorate eutectic, substantially free of admixed lithium perchlorate. Whereas the melting point of mixtures of lithium perchlorate and hydrazine perchlorate deviating from the 1:1 or 1:2 molar ratio have higher melting points than the eutectics, approaching the 140° melting point of hydrazine perchlorate or the 232° C. melting point of lithium perchlorate, the eutectic isolated by evaporation of the filtrate has a melting point corresponding to that of the 1:1 eutectic, at 100–110°, and a mixed melting point of this with an authentic sample of the 1:1 eutectic is the same.

While the invention has been described with particular reference to various specific embodiments thereof, it is to be appreciated that modification and variations can be made without departing from the invention, which is limited only as defined in the appended claims.

What is claimed is:

1. The high-melting 1:1 molar complex compounds of lithium perchlorate with alkylene amines containing from 3 to 10 carbon atoms, selected from the class consisting of alkylene diamines and dialkylene triamines, wherein said alkylene radicals are saturated aliphatic hydrocarbon radicals, situated between terminal amine groups.

2. The compounds of claim 1 in which said alkylene amine is a polymethylene diamine.

3. The tetramethylene diamine 1:1 molar ratio complex with lithium perchlorate.

4. The method of precipitating lithium perchlorate as an amine complex from an organic solvent which comprises adding an alkylene amine containing from 3 to 10 carbon atoms, selected from the class consisting of alkylene diamines and dialkylene triamines, wherein said alkylene radicals are saturated aliphatic hydrocarbon radicals situated between terminal amine groups, to a solution of lithium perchlorate in an organic solvent, thereby precipitating the complex of said amine with said perchlorate.

5. The method of claim 4 in which said amine is a polymethylene primary diamine.

6. The method of claim 5 in which said amine is tetramethylene diamine.

7. The method of purifying a solution comprising dissolved lithium perchlorate in the presence of a dissolved eutectic adduct of hydrazine perchlorate with lithium perchlorate, said lithium perchlorate and said adduct of hydrazine perchlorate with lithium perchlorate being dissolved in an organic solvent, which comprises adding an alkylene amine containing from 3 to 10 carbon atoms, selected from the class consisting of alkylene diamines and dialkylene triamines, wherein said alkylene radicals are saturated aliphatic hydrocarbon radicals situated between terminal amine groups, to a solution of lithium perchlorate in an organic solvent containing a dissolved eutectic adduct of hydrazine perchlorate with lithium perchlorate, selected from the class consisting of the 1:1 and the 1:2 molar ratio adducts of said perchlorates, to precipitate said dissolved lithium perchlorate as a complex with said amine from said solution.

References Cited by the Examiner

UNITED STATES PATENTS 2,686,798   8/1954   Gmitter _____ 260—583 XR

CHARLES B. PARKER, *Primary Examiner.*

OSCAR R. VERTIZ, *Examiner.*

J. W. WHISLER, A. H. SUTTO, *Assistant Examiners.*